US012682331B2

(12) United States Patent
Morgan et al.

(10) Patent No.: US 12,682,331 B2
(45) Date of Patent: Jul. 14, 2026

(54) FLEXIBLE SELF-SERVICE TERMINAL (SST) TRANSACTION PROCESSING

(71) Applicant: NCR Voyix Corporation, Atlanta, GA (US)

(72) Inventors: Kip Oliver Morgan, Atlanta, GA (US); Gina Torcivia Bennett, Lawrenceville, GA (US); Jerry Steven Massey, Lawrenceville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 138 days.

(21) Appl. No.: 18/129,199

(22) Filed: Mar. 31, 2023

(65) Prior Publication Data

US 2024/0330888 A1 Oct. 3, 2024

(51) Int. Cl.
G06Q 20/18 (2012.01)
G06Q 20/20 (2012.01)
G06Q 20/32 (2012.01)

(52) U.S. Cl.
CPC ........... G06Q 20/18 (2013.01); G06Q 20/204 (2013.01); G06Q 20/3223 (2013.01)

(58) Field of Classification Search
CPC .. G06Q 20/18; G06Q 20/204; G06Q 20/3223; G06Q 10/083; G06Q 10/0836;
(Continued)

(56) References Cited

U.S. PATENT DOCUMENTS 6,722,473 B1 * 4/2004 Ramachandran ..... G07F 19/202
705/16
7,644,041 B1 * 1/2010 Schultz ................. G06Q 40/02
705/45

(Continued)

FOREIGN PATENT DOCUMENTS

AU 2013242807 A1 * 5/2014
JP 2003091689 A * 3/2003
(Continued)

OTHER PUBLICATIONS

Rinaldi C, D'Aguilar M, Egan M. Understanding the Online Environment for the Delivery of Food, Alcohol and Tobacco: An Exploratory Analysis of 'Dark Kitchens' and Rapid Grocery Delivery Services. Int J Environ Res Public Health. May 2, 2022;19(9):5523. (Year: 2022).*

(Continued)

*Primary Examiner* — Ashford S Hayles

(74) *Attorney, Agent, or Firm* — Schwegman Lundberg & Woessner, P.A.

(57) ABSTRACT

Self-Service Terminals (SSTs) are enhanced to invoke remote online retailers' transaction systems. Remote transaction interfaces for the systems are hosted by remote servers and rendered on the SSTs. The remote interfaces notify the SSTs when payment is needed to complete transactions on the SSTs. The SSTs activate the appropriate payment peripherals of the SSTs and provide card data for card payments or verifications for cash payments back to the remote interfaces. When cash payments are received, the SSTs send the corresponding amounts and retailer identifiers for the retailers to a cloud-based reconciliation server. In an embodiment, the SSTs are located in a store associated with a retailer that is different from retailers associated with the remote interfaces. In an embodiment, the SSTs are stand-alone SSTs located outdoors.

19 Claims, 5 Drawing Sheets

(58) Field of Classification Search
CPC .......... G06Q 20/3274; G06Q 30/0601; G06Q
50/12; G07D 11/00; G07F 9/001; G07F
9/002; G07F 19/20
See application file for complete search history.

(56) References Cited

U.S. PATENT DOCUMENTS

| | | | | |
|---|---|---|---|---|
| 10,726,246 B1* | 7/2020 | McClellan | .............. | G07F 9/002 |
| 2002/0035538 A1* | 3/2002 | Moreau | .................. | G06Q 20/10 |
| | | | | 705/39 |
| 2002/0069170 A1* | 6/2002 | Rizzo | ................. | G06Q 20/4014 |
| | | | | 705/17 |
| 2002/0087413 A1* | 7/2002 | Mahaffy | ................. | G10L 13/00 |
| | | | | 705/16 |
| 2002/0161598 A1* | 10/2002 | Kim | ................... | G06Q 20/4037 |
| | | | | 705/14.51 |
| 2003/0197061 A1* | 10/2003 | Din | ........................... | G07F 5/18 |
| | | | | 235/383 |
| 2004/0024701 A1* | 2/2004 | Hansen | ................. | G06Q 20/10 |
| | | | | 705/39 |
| 2004/0153421 A1* | 8/2004 | Robinson | ............... | G06Q 20/20 |
| | | | | 705/75 |
| 2005/0033651 A1* | 2/2005 | Kogan | .................. | G06Q 30/06 |
| | | | | 705/26.1 |
| 2007/0235520 A1* | 10/2007 | Smith | ................... | G06Q 20/40 |
| | | | | 235/379 |
| 2008/0052182 A1* | 2/2008 | Marshall | .............. | G06Q 20/102 |
| | | | | 705/40 |
| 2008/0065545 A1* | 3/2008 | Barcelou | ............. | G07F 17/0014 |
| | | | | 705/40 |
| 2009/0108015 A1* | 4/2009 | Kreamer | ................. | G07F 17/40 |
| | | | | 705/17 |
| 2009/0216651 A1* | 8/2009 | Ghafoor | ................. | G06Q 20/40 |
| | | | | 705/17 |
| 2009/0254447 A1* | 10/2009 | Blades | .............. | G06Q 30/0601 |
| | | | | 705/40 |
| 2009/0302103 A1* | 12/2009 | Kolinski-Schultz | .... | G07F 19/20 |
| | | | | 235/379 |
| 2009/0321515 A1* | 12/2009 | Turner | ................... | G07F 9/026 |
| | | | | 235/381 |
| 2010/0042236 A1* | 2/2010 | Chow | .................... | G07F 19/20 |
| | | | | 700/94 |
| 2010/0044430 A1* | 2/2010 | Song | ...................... | G06Q 40/00 |
| | | | | 235/379 |
| 2010/0205063 A1* | 8/2010 | Mersky | ............... | G06Q 20/204 |
| | | | | 705/40 |
| 2011/0225063 A1* | 9/2011 | Grunski | ............. | G06Q 30/0633 |
| | | | | 705/26.8 |
| 2011/0258122 A1* | 10/2011 | Shader | .................. | G06Q 20/14 |
| | | | | 705/67 |
| 2013/0006785 A1* | 1/2013 | Perkins | ................ | G06Q 20/202 |
| | | | | 705/18 |
| 2013/0132217 A1* | 5/2013 | Yahn | ....................... | G07F 9/001 |
| | | | | 194/215 |
| 2013/0226697 A1* | 8/2013 | Englebardt | .......... | G06Q 20/227 |
| | | | | 705/14.51 |
| 2013/0275243 A1* | 10/2013 | Ramaratnam | ........ | G06Q 20/202 |
| | | | | 705/21 |
| 2013/0275247 A1* | 10/2013 | Ramaratnam | .......... | G06Q 20/20 |
| | | | | 705/16 |
| 2013/0317923 A1* | 11/2013 | Capps | .................... | G06Q 20/12 |
| | | | | 705/16 |
| 2014/0136351 A1* | 5/2014 | Lennon | .................. | G06Q 20/14 |
| | | | | 705/16 |
| 2014/0358707 A1* | 12/2014 | Perkins | ................. | G06Q 20/02 |
| | | | | 705/17 |
| 2014/0379578 A1* | 12/2014 | Chan | ...................... | G06Q 20/02 |
| | | | | 705/44 |
| 2015/0058207 A1* | 2/2015 | Vanderlaan | ............ | G06Q 40/02 |
| | | | | 705/40 |
| 2015/0088698 A1* | 3/2015 | Ackerman | ......... | G06Q 30/0637 |
| | | | | 705/26.82 |
| 2016/0048818 A1* | 2/2016 | Tulluri | .............. | G06Q 20/1085 |
| | | | | 705/43 |
| 2016/0155127 A1* | 6/2016 | Hartman | ................ | H04N 5/772 |
| | | | | 705/18 |
| 2016/0252893 A1* | 9/2016 | Kamyshnikov | ...... | G06Q 20/108 |
| | | | | 700/231 |
| 2018/0060928 A1* | 3/2018 | Sadler | .................... | G06Q 20/20 |
| 2019/0050921 A1* | 2/2019 | Ryner | ................. | G06Q 20/326 |
| 2020/0005295 A1* | 1/2020 | Murphy | .............. | G06Q 20/405 |
| 2020/0126059 A1* | 4/2020 | Kudssi | .............. | G06Q 20/3821 |
| 2020/0380969 A1* | 12/2020 | Burris | ................... | G06V 40/70 |
| 2021/0365915 A1* | 11/2021 | Kaufman | ............. | G06Q 20/203 |
| 2022/0036344 A1* | 2/2022 | Vukich | ............... | G06Q 20/351 |
| 2022/0180710 A1* | 6/2022 | Kütt | ...................... | G06Q 10/087 |
| 2023/0401937 A1* | 12/2023 | Murn | .................... | G06V 10/82 |
| 2024/0013606 A1* | 1/2024 | Smee | ...................... | G07F 9/026 |

FOREIGN PATENT DOCUMENTS

| | | | | |
|---|---|---|---|---|
| JP | 2018206215 A | * | 12/2018 | |
| WO | WO-2012009579 A2 | * | 1/2012 | .............. G07F 7/06 |

OTHER PUBLICATIONS

Kirk, P. (2022). Dark Store Struggles: Convesrions of empty retail stores into mini warehouses are expected to wane as in-store shopping makes a comeback. Wealth Management Real Estate, 13. (Year: 2022).*

* cited by examiner

100A

100B

110

100C

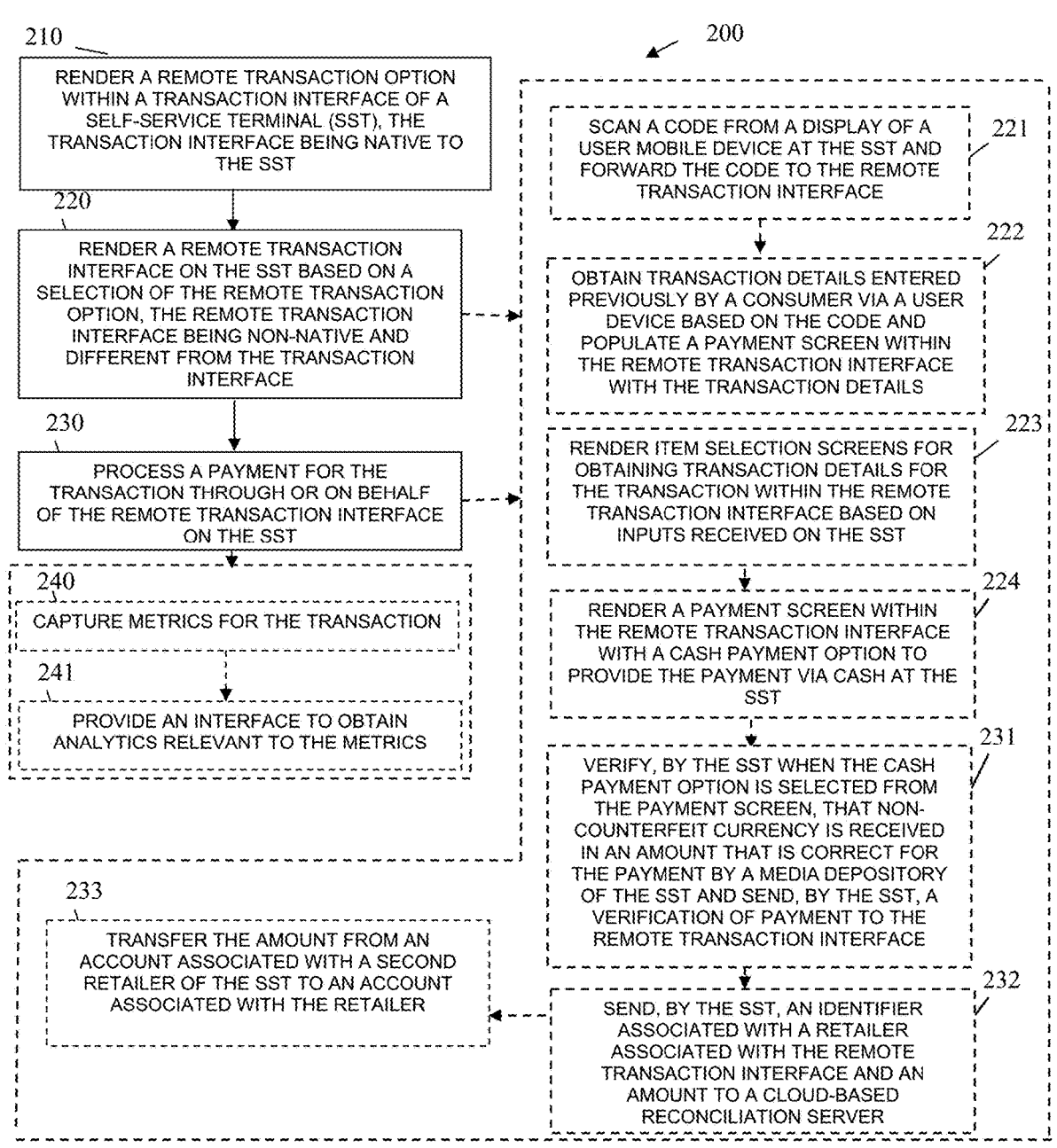

210

RENDER A REMOTE TRANSACTION OPTION WITHIN A TRANSACTION INTERFACE OF A SELF-SERVICE TERMINAL (SST), THE TRANSACTION INTERFACE BEING NATIVE TO THE SST

220

RENDER A REMOTE TRANSACTION INTERFACE ON THE SST BASED ON A SELECTION OF THE REMOTE TRANSACTION OPTION, THE REMOTE TRANSACTION INTERFACE BEING NON-NATIVE AND DIFFERENT FROM THE TRANSACTION INTERFACE

230

PROCESS A PAYMENT FOR THE TRANSACTION THROUGH OR ON BEHALF OF THE REMOTE TRANSACTION INTERFACE ON THE SST

240

CAPTURE METRICS FOR THE TRANSACTION

241

PROVIDE AN INTERFACE TO OBTAIN ANALYTICS RELEVANT TO THE METRICS

233

TRANSFER THE AMOUNT FROM AN ACCOUNT ASSOCIATED WITH A SECOND RETAILER OF THE SST TO AN ACCOUNT ASSOCIATED WITH THE RETAILER

200

221

SCAN A CODE FROM A DISPLAY OF A USER MOBILE DEVICE AT THE SST AND FORWARD THE CODE TO THE REMOTE TRANSACTION INTERFACE

222

OBTAIN TRANSACTION DETAILS ENTERED PREVIOUSLY BY A CONSUMER VIA A USER DEVICE BASED ON THE CODE AND POPULATE A PAYMENT SCREEN WITHIN THE REMOTE TRANSACTION INTERFACE WITH THE TRANSACTION DETAILS

223

RENDER ITEM SELECTION SCREENS FOR OBTAINING TRANSACTION DETAILS FOR THE TRANSACTION WITHIN THE REMOTE TRANSACTION INTERFACE BASED ON INPUTS RECEIVED ON THE SST

224

RENDER A PAYMENT SCREEN WITHIN THE REMOTE TRANSACTION INTERFACE WITH A CASH PAYMENT OPTION TO PROVIDE THE PAYMENT VIA CASH AT THE SST

231

VERIFY, BY THE SST WHEN THE CASH PAYMENT OPTION IS SELECTED FROM THE PAYMENT SCREEN, THAT NON-COUNTERFEIT CURRENCY IS RECEIVED IN AN AMOUNT THAT IS CORRECT FOR THE PAYMENT BY A MEDIA DEPOSITORY OF THE SST AND SEND, BY THE SST, A VERIFICATION OF PAYMENT TO THE REMOTE TRANSACTION INTERFACE

232

SEND, BY THE SST, AN IDENTIFIER ASSOCIATED WITH A RETAILER ASSOCIATED WITH THE REMOTE TRANSACTION INTERFACE AND AN AMOUNT TO A CLOUD-BASED RECONCILIATION SERVER

FIG. 2A

FLEXIBLE SELF-SERVICE TERMINAL (SST) TRANSACTION PROCESSING

BACKGROUND

Many retailers are shutting down in urban areas due to theft. Even prior to the staggering rise in retail theft, urban communities were often labeled as "food deserts" with limited access to affordable and nutritious food. A sizeable number of consumers living in urban areas are unbanked, meaning they lack bank accounts and credit cards. As a result, generally the only means by which such unbanked consumers can obtain goods and services is by purchasing with cash. When ordering online, however, there is typically no means by which a consumer can pay with cash. Further, many urban consumers either lack reliable Internet connectivity or cannot afford Internet access, and thus, are left without a means to order online. Further, many retailers are moving to non-cash stores where only credit or debit cards are accepted as payment for goods and services. Thus, many urban dwellers are finding it difficult to survive in their own communities.

It is not just urban consumers that are underserved, however, as many rural consumers also find it difficult to purchase the goods and services they need. Retailers have always struggled with profitability for remote and less populated areas of the country. Consequently, retail stores are rarely available in these communities. Moreover, reliable Internet access is often non-existent in rural communications. As a result, rural consumers often have to make long road trips to find their desired goods because stores are not available in their communities and online shopping is spotty and unreliable without high-speed Internet connectivity. Additionally, some rural consumers are concerned with their privacy and are reluctant to shop online and pay with credit cards preferring instead to shop in person and pay with cash.

Retailers want to serve the urban and rural communities better and understand there are sales to be made in these communities. However, retailers have not figured out how they can be profitable in these communities.

SUMMARY

In various embodiments, a system, a method, and a Self-Service Terminal (SST) for flexible SST transaction processing are presented. A native transaction interface of an SST renders a remote transaction option on a welcome screen of the native transaction interface. Responsive to a selection of the option, a remote transaction interface is rendered on the SST for a remote retailer that is different from the retailer associated with the SST. A payment peripheral of the SST is activated based on a payment message received from the remote transaction interface. Payment data or payment verification is provided to the remote transaction interface based on information received from the payment peripheral. When payment is provided as cash to the payment peripheral, the SST sends the amount of cash received and an identifier for the remote retailer to a cloud-based payment reconciliation server.

BRIEF DESCRIPTION OF THE DRAWINGS

FIG. 2A is a flow diagram of a method for flexible SST transaction processing, according to an example embodiment.

DETAILED DESCRIPTION

As stated above, urban and rural communities are underserved. These communities do not have access to the goods and services they need and/or lack the means or the desire to order the goods online. Furthermore, a sizable portion of urban and/or rural consumers are unbanked and need to pay for goods with cash, which presents issues when ordering online and when attempting to purchase goods in card-only stores.

The above-noted technical problems associated with facilitating transactions for rural and urban consumers are resolved by the technical solutions provided herein and below. According to example embodiments of the technology disclosed herein, self-Service Terminals (SSTs) are enhanced with flexible capabilities that permit remote and external retailers to sell their goods to consumers via standalone and/or in-store retailer SSTs. The consumers can pay in cash and/or using credit/debit cards at the SSTs. Moreover, the consumers can order directly with desired retailers via user-operated devices and opt to complete the transactions by paying in person at a designated SST which is in a convenient proximity to the consumer. The consumer is provided a code and the code is scanned at the designated SST, causing the SST to resume a pending transaction with payment in person at the SST. Additionally, consumers can elect for delivery at designated store locations, designated remote lockers, or to the home addresses of consumers. In-person cash payments are resolved between the retailers by a cloud service. Additionally, metrics regarding the flexible transactions processed at the SSTs are retained and analytics are provided to the retailers via the cloud service. The analytics can provide valuable insights into the little-known purchasing behaviors of urban, rural, cash-only, and/or unbanked consumers.

Example embodiments of the disclosed technology make a variety of enhancements to existing transaction managers of standalone and in-store SSTs and to existing online transaction managers of the retailers. Many retailers already have delivery services in place for online orders, such that no changes are needed with respect to transaction deliveries. Furthermore, stores of retailers already have a variety of pickup options such that these options are leveraged for transaction pickups.

Figure 1A:
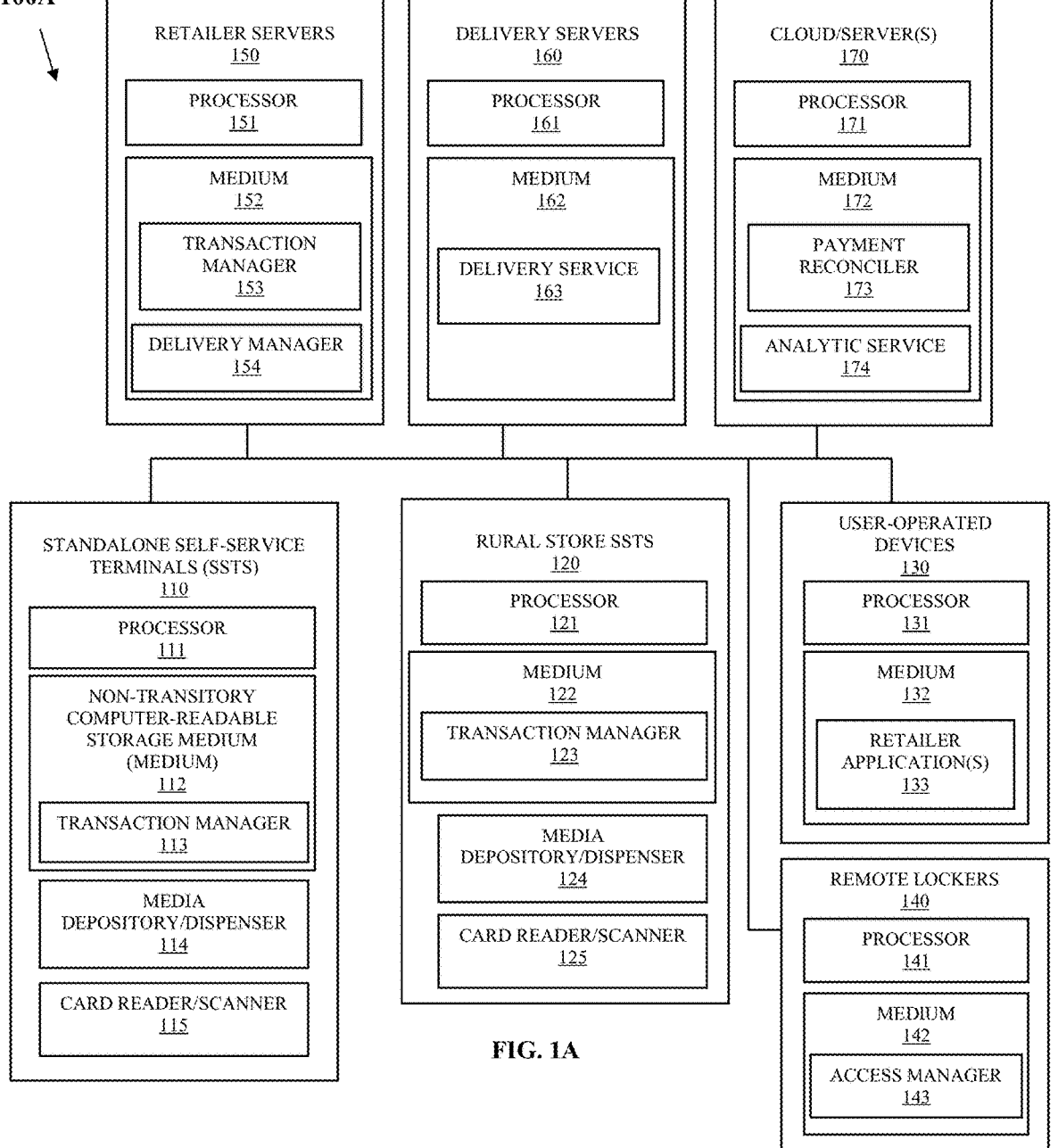
FIG. 1A is a diagram of a system for flexible SST transaction processing, according to an example embodiment.

FIG. 1A is a diagram of a system 100A for flexible SST transaction processing, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of flexible SST transaction processing presented herein and below.

System 100 includes standalone SSTs 110, rural store SSTs 120, user-operated devices 130, optional remote lockers 140, retailer servers 150, delivery servers 160, and a cloud 170 or a server 170 (hereinafter "cloud" 170). Each standalone SST 110 includes a processor 111 and a non-transitory computer-readable storage medium 112, which includes executable instructions for a transaction manager 113. Processor 111 obtains or is provided the executable instructions from medium 112 causing processor 111 to perform operations discussed herein and below with respect to 113. Each standalone SST 110 further includes a media depository/dispenser 114 for accepting and dispensing cash and coins. Each standalone SST 110 further includes a card reader/scanner 115 for reading card data from cards and scanning barcodes and/or quick response (QR) codes.

Each rural SST 120 includes a processor 121 and a non-transitory computer-readable storage medium 122, which includes executable instructions for a transaction manager 123. Processor 121 obtains or is provided the executable instructions from medium 122 causing processor 121 to perform operations discussed herein and below with respect to 123. Each rural SST 120 further includes a media depository/dispenser 124 for accepting and dispensing cash and coins. Each rural SST 120 further includes a card reader/scanner 125 for reading card data from cards and scanning barcodes and/or quick response (QR) codes Each user-operated device 130 includes a processor 131 and a non-transitory computer-readable storage medium 132, which includes executable instructions for one or more retailer applications (apps) 133. Processor 131 obtains or is provided the executable instructions from medium 132 causing processor 131 to perform operations discussed herein and below with respect to 133.

Each optional remote locker 140 includes a processor 141 and a non-transitory computer-readable storage medium 142, which includes executable instructions for an access manager 143. Processor 141 obtains or is provided the executable instructions from medium 142 causing processor 141 to perform operations discussed herein and below with respect to 143.

Each retail server 150 includes a processor 151 and a non-transitory computer-readable storage medium 152, which includes executable instructions for a transaction manager 153 and a delivery manager 154. Processor 151 obtains or is provided the executable instructions from medium 152 causing processor 151 to perform operations discussed herein and below with respect to 153.

Each delivery server 160 includes a processor 161 and a non-transitory computer-readable storage medium 162, which includes executable instructions for a delivery service 163. Processor 161 obtains or is provided the executable instructions from medium 162 causing processor 161 to perform operations discussed herein and below with respect to 163.

Cloud 170 includes at least one processor 171 and a non-transitory computer-readable storage medium 172, which includes executable instructions for payment reconciler 173 and analytic service 174. Processor 171 obtains or is provided the executable instructions from medium 172 causing processor 171 to perform operations discussed herein with respect to 173-174.

Existing transaction managers associated with standalone SSTs and in-store SSTs are enhanced to provide additional capabilities via transaction manager 113 and 123. Furthermore, existing online retailer transaction managers are enhanced to provide additional capabilities via transaction manager 153.

Initial welcome screens associated with transaction managers 113 and 123 are enhanced to include a user option in the transaction interface to access a given retailer's transaction manager 153 for purposes of initiating an online transaction with that retailer or continuing a pending transaction with that transaction manager 153. When the transaction is being initiated for a first time at the SST 110 and/or 120, the corresponding online transaction manager 153 may present a full product catalog for viewing and ordering. Selection of the option to initiate a transaction with a given retailer, causes a workflow associated with manager 153 to be executed on the corresponding server 150 with the transaction interface associated with manager 153 rendered on SST 110 and/or 120. A payment screen associated with the transaction interface of manager 153 is enhanced to present a payment option that allows the consumer to make payment by cash at SST 110 and/or 120.

Transaction manager 153 notifies transaction manager 113 and/or 123 that a payment is being supplied and the method of payment. This causes manager 113 and/or 123 to activate media depository/dispenser 114 and/or 124 or to activate card reader 115 and/or 125. When payment is made via cash, manager 153 notifies manager 113 and/or 123 of the amount due from the consumer and manager 113 and/or 123 confirms and verifies a cash deposit of the amount due back to manager 153. Manager 113 and/or 123 also sends a terminal identifier for SST 110 and/or 120, a retailer identifier for the retailer associated with manager 153, a retailer identifier associated with SST 110 and/or 120 if applicable, a transaction identifier for the transaction, and the amount of cash received to payment reconciler 173 and/or analytic service 174.

When the payment method supplied by the consumer is a payment card (e.g., a debit or credit card), transaction manager 113 and/or 123 activates card reader 115 and/or 125. Card reader 115 and/or 125 returns card data from the consumer's card to manager 113 and/or 123 and manager 113 and/123 forwards the card data to manager 153. In an embodiment, manager 113 and/or 123 also sends a transaction amount, transaction identifier, terminal identifier, retailer identifier for the retailer associated with manager 153, and retailer identifier for the the retailer associated with SST 110 and/or 120 if applicable to payment reconciler 173 and/or analytic service 174.

In an embodiment, transaction manager 113 and/or 123 maintains a table of partnered retailers and the data formats associated with their loyalty identifiers in their loyalty systems. Manager 113 and/or 123 uses the table to identify a scanned loyalty identifier scanned via scanner 115 and/or 125 or an entered loyalty identifier provided by the consumer and provides the loyalty identifier to transaction manager 153. In this way, a consumer can associate a given transaction with their loyalty account for the corresponding retailer at the SST 110 and/or 120 without being required to manually supply the loyalty identifier within the transaction interface associated with manager 153.

Transaction manager 153 is further enhanced to provide an option at a start of a transaction or during payment processing to provide a payment for a given transaction at a later time at an SST 110 and/or 120. In this situation, the consumer initiates the transaction with the corresponding retailer via a user-operated device 130 and a user interface associated with retailer application 133.

In response to a selection of an option to pay later at an SST 110 and/or 120, manager 153 identifies locations of SSTs 110 and 120 and presents a selection screen to the consumer to select an SST 110 and 120. The SST 110/120 options presented to the consumer may be pre-selected or pre-determined by the consumer. Alternatively, or additionally, the available SSTs 110 and 120 proximate to a location of a known consumer's home address and/or a location proximate to device 130 at the time of the transaction may be presented to the consumer for reference. In some cases, the available SSTs 110 and 120 are presented based on predefined relationships that the retailer has with other retailers, if any, that are associated with SSTs 110 and 120. For example, the retailer can receive a referral fee or have a fee arrangement with a different retailer to present the different retailer's stores and SSTs 110 and 120 to the consumer.

In response to a selection of an option to pay later at an SST 110 and/or 120, manager 153 flags the transaction details as pending and generates a unique code, which when later presented to manager 153 causes manager 153 to recall the pending transaction for payment completion by the consumer. In an embodiment, the code (e.g., a QR code) is encoded with a unique identifier for the pending transaction, and optionally, with the transaction details. The code is provided back to the consumer via app 133 and/or via a text message to the consumer's device 130. Transaction managers 113 and 123 are further enhanced to identify the code when scanned from a display of the consumer's device, decode the information encoded in the code, and forward the decoded information directly to the corresponding manager 153. Alternatively, or additionally, the transaction interface of manager 153 is enhanced to provide a welcome screen option for resuming a pending transaction and managers 113 and 123 forward any scanned code by scanners 115 and 125 directly to manager 153.

Transaction manager 153 is further enhanced to provide additional delivery and pickup options based on the flexible transaction processing of system 100A. For example, a store associated with a retailer of SST 120 in agreement with the retailer associated with manager 153 permits deliveries of goods to the store for pickup by the consumer. As another example, a remote external locker 140 can be activated by manager 153 for receipt of delivered goods, whereby manager 153 may configure access manager 143 to open when a consumer provides a linked code at the remote locker 140. In an embodiment, both delivery and pickup of the goods are associated with a same code and access manager 143 is configured to invalidate the code after the locker 140 is opened twice. In an embodiment, access manager 143 is provided to separate codes by manager 153, one to open the locker for receipt of the goods by the delivery personnel and one to open the locker for pickup of the goods by the consumer, in which case, access manager 143 may be configured to invalidate any previously provided code once the code is used a first time.

In an embodiment, delivery service 163 configures access manager 143 for the delivery personnel and for pickup by the consumer. In this embodiment, delivery service 163 is provided a device identifier for device 130 of the consumer by manager 153 when the consumer selects the locker 140 as a pickup location for delivery of the goods. Delivery service 163 texts the access code to the device 130 when the goods are ready for pickup.

When the consumer selects a delivery location for a transaction, manager 153 interacts with a delivery service 163 to delivery the goods to the location. In an embodiment, delivery service 163 is an existing delivery service 163 that requires no source code changes to arrange for the goods to be picked up at fulfillment location identified by manager 153 and delivered to a consumer designated location. That is, in such an embodiment, the workflow associated with scheduling and fulfilling delivery need not be modified from what already exists with the retailer and the delivery service.

In an embodiment, manager 153 is further enhanced to permit the consumer to tip delivery personnel before payment is confirmed by manager 153. In an embodiment, manager 153 adds a customary tip to any consumer selected delivery when the delivery is considered to be extensive, such as large heavy items, etc.

Payment reconciler 173 performs retailer-to-retailer payments on behalf of the disparate retailers that subscribe to system 100A. For example, at predefined intervals of time, such as once a day, week, or month, payment reconciler 173 determines that $1,000 cash was deposited in SST 110 and/or 120. The $1,000 is transferred from an account associated with the entity that controls cash deposits in SST 110 and/or 120 to a retailer account associated with the transactions processed by the corresponding manager 153. In an embodiment, reconciler 173 debits a fee for each transfer from one and/or both of the entities. In an embodiment, the entity associated with cloud 170 maintains an account to which cash deposits are transferred and from which payments are transferred. In this embodiment, cash reconciliation is done in real time between the two retailer entities.

Analytic service 174 records transaction metrics for transactions processed via managers 113, 123, and 153 and/or app 133. The metrics are aggregated and used to provide reports to the retailers. The reports are available on-demand through a user interface of service 174 and/or the user interface permits custom reports to be defined by the retailers and automatically reported at retailer-defined intervals of time to systems and/or of the retailers.

In an embodiment, manager 113 is a newly installed manager 113, which did not exist on SST 110 previously. For example, SST 110 is an automated teller machine (ATM), which is located outdoors, and which is used for performing financial transactions of consumers. A welcome screen of ATM 110 is enhanced to call manager 113 when a consumer selects a retail selection option rather that a financial transaction operation. Manager 113 displays a listing of subscribing retailers for the consumer to select a desired retailer, which causes manager 113 to initiate a transaction interface associated with the corresponding manager 153. This permits existing pervasive and secure ATMs, particularly in urban areas but also in rural areas, to be enhanced for performing retail transactions on behalf of retailers and consumers.

In an embodiment, managers 113, 123, and 153 perform automated age and identity verification for any transaction requiring verification. For example, SSTs 110 and 120 include a camera which captures an image of the consumer at the SST 110 and/or 120. SSTs 110 and 120 also include a government card identification scanner which scans a government-issued identification card of the consumer. Managers 113, 123, and/or 153 compare the image of the consumer against the government-issued image of the consumer and government-issued information and verify that the consumer is of the required age and/or is who the consumer is purporting to be for the transaction. It is noted that automated age and identity verification is capable of being performed in other managers at the SSTs 110 and/or 120 on behalf of the retailer associated with manager 153 during the transaction. Age verification is necessary, for example, when the transaction involves restricted goods, such as alcohol and tobacco. Identity verification is necessary for purchase of certain goods such as narcotics being filled via a prescription, firearms, certain over-the-counter drugs such as pseudoephedrine.

In an embodiment, SST 120 is located and operated in a store of a first retailer and the manager 153 is operated online by a disparate and different retailer from the first retailer. In an embodiment, the store location is rural, urban, exurban, or suburban.

Figure 1B:
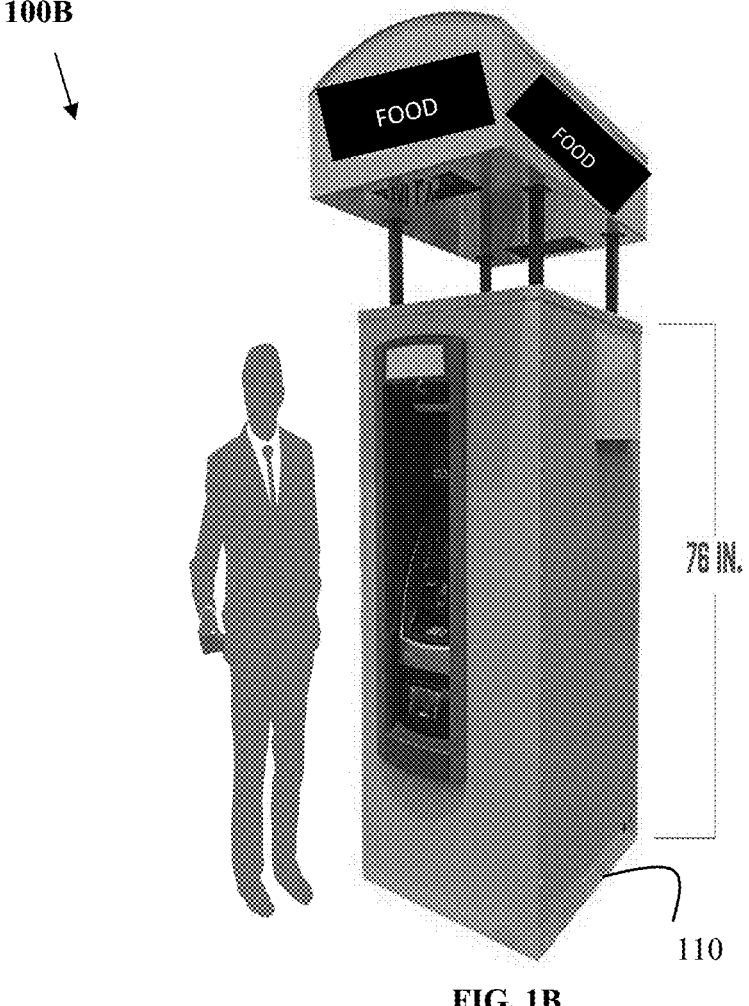
FIG. 1B is a diagram of standalone SSTs for flexible transaction processing, according to an example embodiment.

FIG. 1B is a diagram 100B of a standalone SST for flexible transaction processing, according to an example embodiment. In the example, SST 110 is labeled with branding identified as "food." This provides a visual indication to a consumer that food can be ordered for pickup and/or delivery at SST 110. In an example embodiment, the SST 110, via manager 123, is associated with a specific type of retail establishment, such as a grocery store, restaurant, or the like. In an embodiment, the SST 110 can also perform financial transactions as an ATM.

In an embodiment, SST 110 is adjacent to or attached on an outside portion of a "dark store." A dark store is a store in which a consumer cannot enter, such as a warehouse or an order online and pickup only store. In an example use case scenario, a consumer orders food or goods via a transaction on SST 110 and pays either by cash or card at SST 110. Manager 153 initiates fulfillment of the order and makes the goods available via a designated locker 140 or via a pickup window associated with the store. Manager 153 also sends a notification to device 130 when the order is ready for pickup. Dark stores are becoming more pervasive in the industry in urban areas where theft is a problem. This embodiment provides an efficient, secure, and safe mechanism by which consumers and retailers can perform transactions to satisfy the needs of both the consumers and the retailers.

Figure 1C:
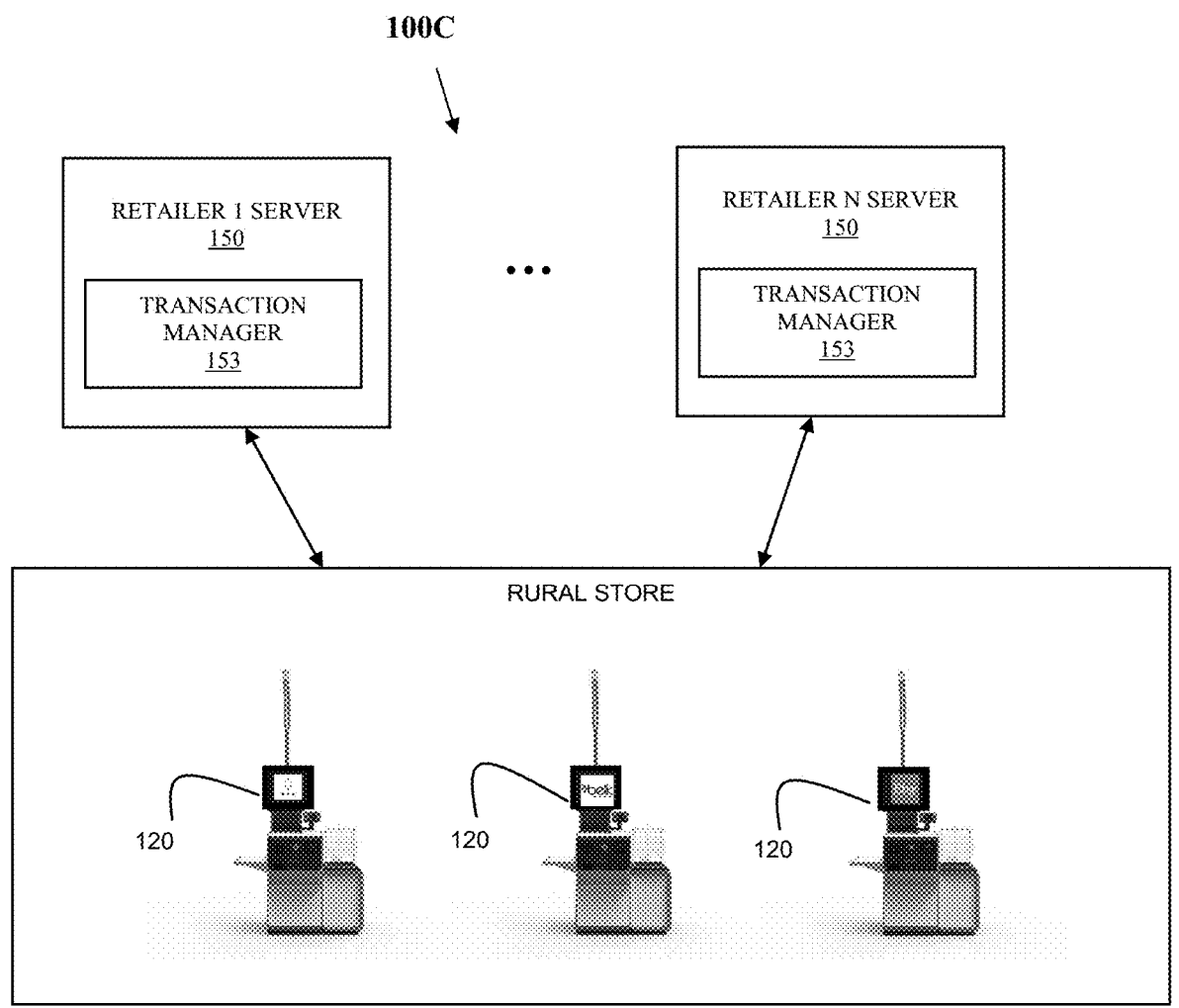
FIG. 1C is a diagram of rural store SSTs for flexible transaction processing, according to an example embodiment.

FIG. 1C is a diagram 110C of rural store SSTs for flexible transaction processing, according to an example embodiment. FIG. 1C illustrates in-store SSTs 120 that are enhanced with capabilities via managers 123 to process transactions associated with a variety of disparate retailers via enhanced capabilities of the retailers' transaction managers 153.

For example, consider a small rural town that has only a single retail establishment in which SSTs 120 are situated. Assume that a consumer wants hardware equipment that is available at a major hardware retailer chain, but the nearest hardware store is over 100 miles from the rural store. In addition, the consumer may lack reliable high-speed Internet connectivity and may rely, for example, solely on cell phone coverage (if at all) for Internet access. Online ordering from the hardware chain may be next to impossible for such a consumer because the chain's transaction interface may include product images, graphics, and video, that the consumer's phone is unable to load due to limited network bandwidth/connectivity.

Embodiments of the disclosed technology address these constraints by enabling the consumer to visit the grocery store and operate SST 120 to access the hardware chain's online store via manager 123 and manager 153. The order for the transaction is placed and paid for by the consumer via SST 120. Based on selections made during the transaction by the consumer with manager 153, the goods are either delivered to the grocery store for pickup, delivered to a home address of the consumer, or delivered to a secure locker 140, which is conveniently located on an outside wall of the grocery store.

Capabilities of system 100A alleviate a number of technical constraints associated with underserved consumers. For example, the operations of system 100A permit consumers to order online to pre-stage an uncompleted transaction and then complete the transaction with payment at an SST 110 and/or 120. A first retailer that lacks goods and services desired by a consumer provides a capability through their in-store SST 120, via manager 123, for a consumer to directly order the goods and services of a second and disparate retailer through manager 153. Standalone SSTs 110 are enhanced to complete pending transactions of consumer for a specific retailer and permit, via manager 113, initiation and completion of a transaction with a consumer-selected retailer, via manager 153.

In an embodiment, SST 120 is an ATM located inside the rural store and is separate from other SSTs and/or point-of-sale (POS) terminals used in the rural store. In an embodiment, SST 110 is an ATM remotely located away from any existing store; for example, a drive up only ATM. In an embodiment, SST is capable of being operated in a POS mode as a POS terminal.

Figure 2B:
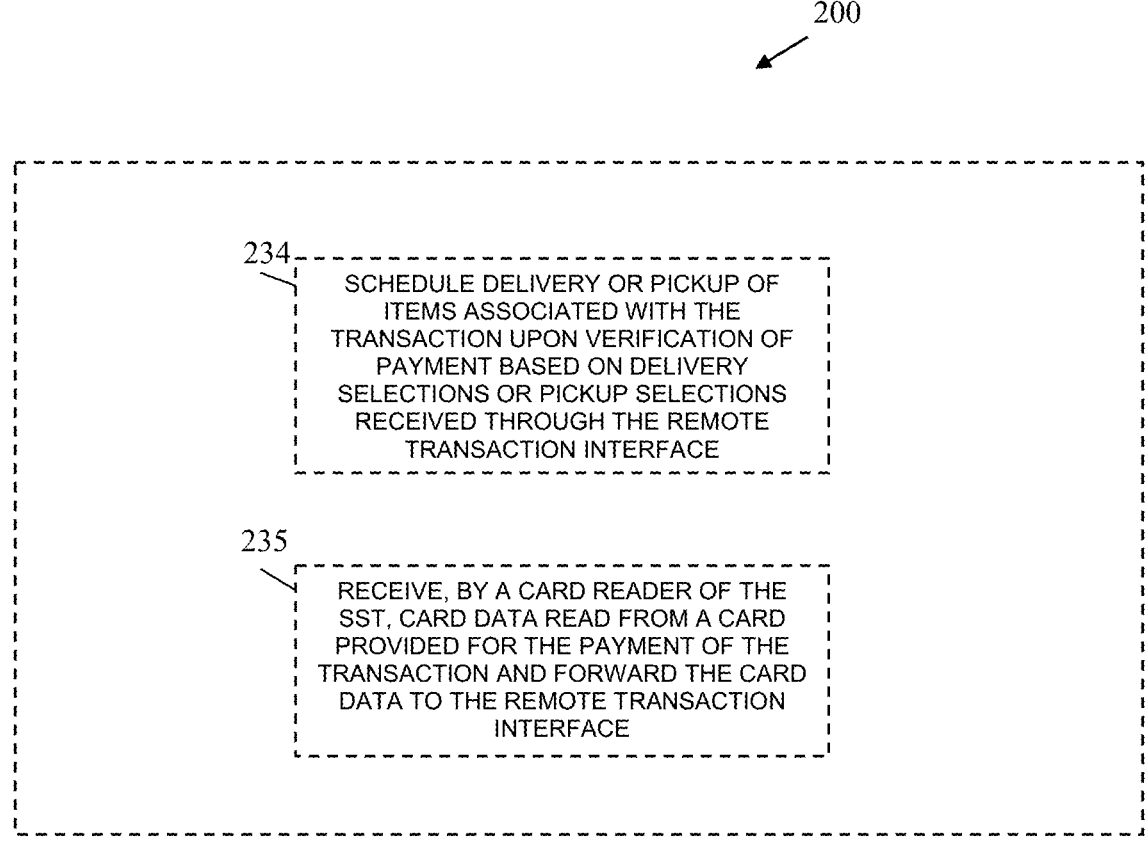
FIG. 2B is a flow diagram of additional embodiments for the method of FIG. 2A.

The above-referenced embodiments and other embodiments will now be discussed with reference to FIGS. 2A and 2B. FIGS. 2A and 2B illustrate a flow diagram of a method 200 for flexible SST transaction processing, according to an example embodiment. The software module(s) that implements the method 200 is referred to as a "flexible SST transaction manager." The flexible SST transaction manager is implemented as executable instructions programmed and residing within memory and/or a non-transitory computer-readable (processor-readable) storage medium and executed by one or more processors of one or more devices. The processor(s) of the device(s) that executes the flexible SST transaction manager are specifically configured and programmed to process flexible SST transaction manager. The flexible SST transaction manager has access to one or more network connections during its processing. The connections can be wired, wireless, or a combination thereof.

In an embodiment, the device that executes the flexible SST transaction manager is SST 110. In an embodiment, device that executes flexible SST transaction manager is SST 120. In an embodiment, the device that executes retailer server 150. In an embodiment, the flexible SST transaction manager is executed on a combination of different devices 110, 120, 150, and/or 170. In an embodiment, the flexible SST transaction manager is all of, or some combination of 113, 123, 153, 173 and/or 174.

At 210 (shown in FIG. 2A), the flexible SST transaction manager renders a remote transaction option within a transaction interface of an SST. The transaction interface is native to the SST. In other words, includes a workflow associated with processing transactions for a retailer of a store or includes a workflow associated with processing transactions associated with financial transactions associated with a bank retailer.

At 220 (shown in FIG. 2A), the flexible SST transaction manager renders a remote transaction interface on the SST based on a selection of the remote transaction option. The remote transaction interface is non-native and different from the transaction interface. Moreover, the remote transaction interface is associated with a workflow and transactions for a different retailer than the retailer which is associated with the SST.

In an embodiment, at 221 (shown in FIG. 2A), the flexible SST transaction manager scans a code from a display of a user mobile device at the SST. The flexible SST transaction manager forwards the code to the remote transaction interface.

In an embodiment of 221 and at 222 (shown in FIG. 2A), the flexible SST transaction manager obtains transaction details entered previously by a consumer via a user device based on the code. The remote interface populates a payment screen within the remote transaction interface with the transaction details. This is associated with a pre-staged transaction performed by the consumer associated with the transaction on a different device prior to coming to the SST and the SST is being to provided payment and complete the pre-staged transaction.

In an embodiment, at 223 (shown in FIG. 2A), the flexible SST transaction manager renders item selection screens for the transaction within the remote transaction interface based on inputs received through input peripherals of the SST. The remote transaction interface is hosted on a remote server, but inputs and selections are made via the SST and its input peripherals during the transaction.

In an embodiment of 223 and at 224 (shown in FIG. 2A), the flexible SST transaction manager renders a payment screen within the remote transaction interface with a cash payment option to provide the payment via cash at the SST. The cash payment option allows an online remotely hosted transaction system associated with the remote transaction interface to accept cash as payment for the transaction at the SST.

At 230 (shown in FIG. 2A), the flexible SST transaction manager processes a payment for the transaction through or on behalf of the remote transaction interface on the SST. That is, payment peripherals of the SST are used to provide payment details or to verify cash receipt of consumer payment for the remote transaction interface.

In an embodiment of 224 and 230, at 231 (shown in FIG. 2A), the SST verifies when the cash payment option is selected from the payment screen non-counterfeit currency is received in an amount that is correct for the payment through a media depository of the SST. The SST also sends a verification of payment to the remote transaction interface for purposes of completing the consumer transaction.

In an embodiment of 231 and at 232 (shown in FIG. 2A), the SST sends an identifier associated with a retailer of the remote transaction interface and an amount received and verified with the payment to a cloud-based reconciliation server. This is sent by the SST to the payment reconciler 173.

In an embodiment of 232 and at 233 (shown in FIG. 2A), the flexible SST transaction manager transfers the amount from an account associated with a second retailer of the SST to an account associated with the retailer of the remote transaction interface. The reconciler 173 performs the transfer on demand when the payment is verified or in batches at predefined intervals of time.

In an embodiment, at 234 (shown in FIG. 2B), the flexible SST transaction manager schedules delivery or pickup of items associated with the transaction upon verification of payment. This is based on delivery selections or pickup selections received through the remote transaction interface. In an embodiment, the flexible SST transaction manager schedules delivery or pickup through delivery services 163.

In an embodiment, at 235 (shown in FIG. 2B), a card reader of the receives card data read from a card provided by the consumer for payment of the transaction. The flexible SST transaction manager forwards the card data to the remote transaction interface for processing the consumer payment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

rendering a remote transaction interface on a self-service terminal (SST) based on a selection of a remote transaction option presented within a welcome screen of a native transaction interface associated with the SST, wherein the remote transaction interface is non-native to the SST and different from the native transaction interface;

processing a payment for a remote transaction by:

activating a payment peripheral of the SST based on a payment message received from the remote transaction interface; and providing payment data from the payment peripheral to the remote transaction interface to complete the payment through the remote transaction at the SST;

wherein the remote transaction interface is associated with a workflow and transactions for a first retailer that is different from a second retailer that is associated with the native transaction interface of the SST;

performing automated age and identity verification, when the remote transaction involves a purchase of a restricted good by capturing an image of a consumer at the SST using a camera of the SST and scanning a government-issued identification card of the consumer using a government card identification scanner of the SST to compare the image of the consumer against a government-issued image of the consumer and government-issued information to verify that the consumer is of a required age and is who the consumer is purporting to be for the remote transaction; and rendering the welcome screen with the remote transaction option within the native transaction interface on the SST once the payment for the remote transaction is verified by the remote transaction interface.

2. The method of claim 1 further comprising, capturing metrics for the remote transaction.

3. The method of claim 2 further comprising, providing an interface to obtain analytics relevant to the metrics.

4. The method of claim 1, wherein rendering the remote transaction interface further includes scanning a code from a display of a user mobile device at the SST and forwarding the code to the remote transaction interface.

5. The method of claim 4, wherein rendering the remote transaction interface further includes obtaining transaction details entered previously by a consumer via a user device based on the code and populating a payment screen within the remote transaction interface with the transaction details.

6. The method of claim 1, wherein rendering the remote transaction interface further includes rendering item selection screens for obtaining transaction details for the remote transaction within the remote transaction interface based on inputs received on the SST.

7. The method of claim 6, wherein rendering the item selection screens further includes rendering a payment screen within the remote transaction interface, the payment screen comprising a cash payment option to provide the payment via cash at the SST.

8. The method of claim 7, wherein processing further includes:

verifying, by the SST, responsive to the cash payment option being selected from the payment screen, that non-counterfeit currency is received by a media depository of the SST in an amount that is correct for the payment; and sending, by the SST, a verification of payment to the remote transaction interface.

9. The method of claim 8, wherein verifying further includes sending, by the SST, an identifier associated with the first retailer of the remote transaction interface and the amount to a cloud-based reconciliation server.

10. The method of claim 9, wherein sending further includes transferring the amount from an account associated with the second retailer of the SST to an account associated with the first retailer.

11. The method of claim 1, wherein processing further includes scheduling delivery or pickup of items associated with the remote transaction upon verification of payment based on delivery selections or pickup selections received through the remote transaction interface.

12. The method of claim 1, wherein processing further includes receiving, by a card reader of the SST, card data read from a card provided for the payment of the remote transaction and forwarding the card data to the remote transaction interface.

13. A self-service terminal (SST), comprising:

a media depository and dispenser;

a card reader;

a camera;

a government card identification scanner;

a processor;

a non-transitory computer-readable storage medium comprising executable instructions; and the executable instructions when executed by the processor cause the processor to perform operations comprising:

rendering a welcome screen within a native transaction interface of the SST with a remote transaction option to perform a remote transaction on the SST with a remote retailer;

responsive to a selection of the remote transaction option, invoking a remote transaction interface associated with the remote retailer on the SST, wherein the remote transaction interface is associated with a workflow and transactions for a first retailer that is different from a second retailer associated with the SST; and performing one or more of:

receiving a selection of a card reader payment option from the remote transaction interface;

activating the card reader; and forwarding card data read from a card to the remote transaction interface;

receiving a cash payment option and a currency amount from the remote transaction interface;

activating the media depository and dispenser; verifying non-counterfeit currency in the currency amount is received by the media depository and dispenser;

sending a verification message to the remote transaction interface; or sending an identifier for the remote retailer and the currency amount to a cloud-based reconciliation server;

performing automated age and identity verification for the remote transaction when the remote transaction is associated with a purchase of a restricted good by capturing an image of a consumer at the SST using the camera and scanning a government-issued identification card of the consumer using the government card identification scanner to compare the image of the consumer against a government-issued image of the consumer and government-issued information to verify that the consumer is of a required age and is who the consumer is purporting to be for the remote transaction; and rendering the welcome screen with the remote transaction option within the native transaction interface on the SST once a payment for the remote transaction is verified by the remote transaction interface.

14. The SST of claim 13, wherein the SST is an automated teller machine.

15. The SST of claim 13, wherein the SST is operated and located in an outdoor environment.

16. The SST of claim 13, wherein the operations associated with the invoking of the remote transaction interface further include:

receiving a loyalty identifier from a loyalty card scanned by a camera or a scanner of the SST; and forwarding the loyalty identifier to the remote transaction interface.

17. The SST of claim 13, wherein the operations associated with the invoking of the remote transaction interface further include:

receiving a code scanned from a mobile device display by a camera or a scanner of the SST;

decoding the code to obtain decoded transaction information; and forwarding the decoded transaction information to the remote transaction interface.

18. A system, comprising:

a cloud server comprising a cloud processor, a self-service terminal (SST) comprising an SST processor; and a retailer server comprising a server processor;

the SST processor configured to execute instructions that cause the SST processor to perform first operations comprising:

rendering a welcome screen with a remote transaction option within a native transaction interface associated with the SST;

responsive to a selection of the remote transaction option, invoking a remote transaction interface associated with the retailer server from the SST, wherein the remote transaction interface is associated with a workflow and transactions for a first retailer that is different from a second retailer that is associated with the SST;

responsive to a payment message received from the retailer server through the remote transaction interface, activating a payment peripheral on the SST, and providing a verification of a payment received message to the retailer server through the remote transaction interface or providing card data for a payment to the retailer server through the remote transaction interface based on information provided from the payment peripheral;

responsive to cash being received as the payment at the SST, sending an amount of the payment and a retailer server identifier for the first retailer to the cloud server;

performing automated age and identity verification for a remote transaction when a purchase associated with the remote transaction is associated with a restricted good by capturing an image of a consumer at the SST using a camera of the SST and scanning a government-issued identification card of the consumer using a government card identification scanner of the SST to compare the image of the consumer against a government-issued image of the consumer and government-issued information to verify that the consumer is of a required age and is who the consumer is purporting to be for the remote transaction; and rendering the welcome screen with the remote transaction option within the native transaction interface on the SST once the payment for the remote transaction is verified by the retailer server through the remote transaction interface;

wherein the SST includes the camera which captures the image of the consumer at the SST and the government card identification scanner which scans the government-issued identification card of the consumer;

the server processor configured to execute instructions that cause the server processor to perform second operations comprising;

hosting and initiating the remote transaction interface based on an invocation received from the SST;

obtaining transaction details for the remote transaction through the remote transaction interface;

rendering a payment screen with a cash payment option within the remote transaction interface for the payment;

responsive to a selection of the cash payment option, instructing the SST to obtain cash for the payment using the payment peripheral; and responsive to the verification received from the SST, scheduling a delivery or a pickup of goods associated with the remote transaction based on the transaction details;

the cloud processor configured to execute instructions that cause the cloud processor to perform third operations comprising:

receiving amount and the retailer server identifier for the payment made in cash at the SST for the remote transaction;

identifying a first account associated with the first retailer and the retailer server;

identifying a second account associated with the second retailer and the SST; and causing the amount to be transferred from the second account to the first account.

19. The system of claim 18, wherein the SST is an automated teller machine, wherein the SST is operated and located in a store of the second retailer that is different from the first retailer associated with the retailer server, or wherein the SST is operated and located outdoors.

\* \* \* \* \*